United States Patent [19]
Saito et al.

[11] Patent Number: 5,220,834
[45] Date of Patent: Jun. 22, 1993

[54] ACCELERATION DETECTOR WITH DIFFERENTIAL TRANSFORMER

[75] Inventors: Hidetoshi Saito; Masahiro Kume, both of Itami, Japan

[73] Assignee: Sumitomo Electric Industries, Ltd., Osaka, Japan

[21] Appl. No.: 639,063

[22] Filed: Jan. 9, 1991

[30] Foreign Application Priority Data

Jan. 10, 1990 [JP] Japan ............................ 2-2797
Jan. 18, 1990 [JP] Japan ............................ 2-10873

[51] Int. Cl.⁵ ............................................. G01D 15/11
[52] U.S. Cl. ....................................... 73/517 R; 336/30
[58] Field of Search ............. 73/517 R, 516 R, 517 B; 336/30

[56] References Cited

U.S. PATENT DOCUMENTS 2,643,869  6/1953  Clark .............................. 73/517 R
2,923,904  2/1960  Hieber ............................ 72/517 R
3,076,343  2/1963  Dumas et al. ................... 73/517 B
3,540,291  11/1970  Ivers ............................. 73/517 B Primary Examiner—John E. Chapman
Attorney, Agent, or Firm—Wenderoth, Lind & Ponack

[57] ABSTRACT

An acceleration detector has a case and a movable magnetic body mounted in the case and supported by a leaf spring secured to the case. The magnetic body is thus movable in either of two opposite directions in response to acceleration. Stoppers made of a magnetic material protrude from an inner surface of the case to locations adjacent both ends of the magenetic body, with predetermined gaps left therebetween. Two pairs of primary and secondary coils are provided around the magnetic body for producing a difference in induced voltages output by the secondary coils according to the displacement of the magnetic body. A yoke made of soft magnetic material extends from the case to location adjacent the magnetic body.

7 Claims, 2 Drawing Sheets

ACCELERATION DETECTOR WITH DIFFERENTIAL TRANSFORMER

BACKGROUND OF THE INVENTION

This invention relates to an acceleration detector for detecting the acceleration and deceleration of a moving body such as an automobile.

Among known acceleration detectors, there is a type having a magnetic body mounted so as to move when subjected to acceleration and a differential transformer for detecting its movement.

One example of this type is shown in FIG. 8. With this differential transformer type acceleration detector 71, when it is subjected to acceleration in the direction of arrow A in the figure, a magnetic body 74 supported by leaf springs 73a and 73b moves in the direction of arrow B in the figure while resiliently deforming the leaf springs. With this movement, the portion of the magnetic body 74 located inside a secondary coil 77b at the righthand side of the figure becomes longer than its portion located inside a secondary coil 77a at the lefthand side, thus producing a difference in induced voltage between the secondary coils 77a and 77b. The acceleration is detected by this difference.

In the figure, numeral 78 designates a primary coil, and 72 a case. One prior art example of this type is disclosed in Japanese Unexamined Utility Model Publication 59-95266.

With this type of detector, if the acceleration is small, the magnetic body moves little, producing too small a voltage difference to be detected clearly. Thus, its detection sensitivity is poor.

With the known detector, the leaf springs for suspending the magnetic body might suffer a permanent deformation or might be destroyed if an excessive acceleration acts on magnetic body 74.

Further, because a difference in voltage is produced by the relative movement between the secondary coil and the magnetic body, they have to be positioned with high accuracy. This will lower the assembling efficiency, take a long time and thus increase the assembling cost.

SUMMARY OF THE INVENTION

It is an object of the present invention to provide a differential transformer type acceleration detector which obviates the abovesaid shortcomings.

In accordance with the present invention, the acceleration detector comprises a case, a movable magnetic body supported by a leaf spring so as to be movable in response to acceleration, a differential transformer having two pairs of primary and secondary coils, and stoppers of magnetic material extending from the case to both ends of the magnetic body with gaps formed therebetween, the gaps being of such a width that magnetic flux can be transmitted between the magnetic body and the stoppers.

The magnetic field generated by the primary coils is propagated to the movable magnetic body through the stoppers or to the stoppers through the movable magnetic member (the order of propagation depends on the winding direction of the primary coils) and then to the secondary coils, inducing a voltage in the secondary coils. The magnitude of the induced voltage depends on the amount of the magnetic flux passing through the secondary coils. The amount of the magnetic flux is determined by the magnetic circuits constituted in part by the the magnetic body. According to the present invention, the stoppers for the magnetic member serve to reduce the entire magnetic reluctance in the circuits and to allow a greater amount of the magnetic flux to progate through the movable magnetic body and gaps. Thus the sensitivity of detection will improve.

Namely, when acceleration acts on the movable magnetic body, moving it toward one of the stoppers, the gap between the movable magnetic body and one of the stoppers will reduce while the gap at the other end of the magnetic body will increase. Thus the magnetic reluctance will reduce at the side of the one of the stoppers because of the reduction in the width the gap, thus allowing a larger amount of magnetic flux to pass therethrough. At the other side, the magnetic reluctance will increase owing to the increase in the width of the gap, developing a phenomenon contrary to the above. By the increase and decrease of the amount of magnetic flux passing between both ends of the magnetic body and the stoppers, a difference between the voltages induced in the secondary coils by the magnetic flux will be produced. Thus, by measuring this difference, even a very low acceleration can be detected.

The detector according to this invention does not produce a difference in induced voltage between two secondary coils when there is a relative displacement between the movable magnetic body and the secondary coils as with prior art detectors, but produces a voltage difference (the detector output) when there is a difference in the width of the gaps defined by the two stoppers and the movable magnetic body. This arrangement eliminates the necessity of adjusting the relative position between the coils and the movable magnetic body with high accuracy. Further, since the stoppers serve as magnetic paths, the entire magnetic reluctance in the two magnetic circuits will be small, thus enhancing the sensitivity of detection as even very small fluctuations in the magnetic reluctance reluctance are in effect detectable. Thus, the output voltage corresponding to a given acceleration will be comparatively great.

Further, since the stoppers serve to restrict any excessive movement of the movable magnetic body, the leaf spring is prevented from being subjected to unduly large loads.

Further, as described above, since the voltage difference is produced utilizing the difference between gaps formed between the stoppers and the movable magnetic body, positioning of the parts is easy. Namely, because coils are usually wound around resin bobbins, dimensional accuracy is low. Thus, with the prior art method, the accuracy of relative positioning between the movable magnetic body and the coils was poor. With the structure according to this invention, the accuracy of gaps is determined by the combination of metallic parts, which can be machined with high precision. The output is determined by the gaps. Thus, the positioning at the time of assembling the detector will be easy.

Further, by using a magnetic material at least for the parts constituting the magnetic circuits, including for that of a yoke extending between the coils and to a location adjacent the side of the magnetic body, the magnetic reluctance in the magnetic circuits will below, thus facilitating enhanced output.

Though small in size, the detector according to the present invention has a high sensitivity of detection and operates reliably even if subjected to excessive acceleration and shocks. Further, it can be manufactured easily and thus at a low cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
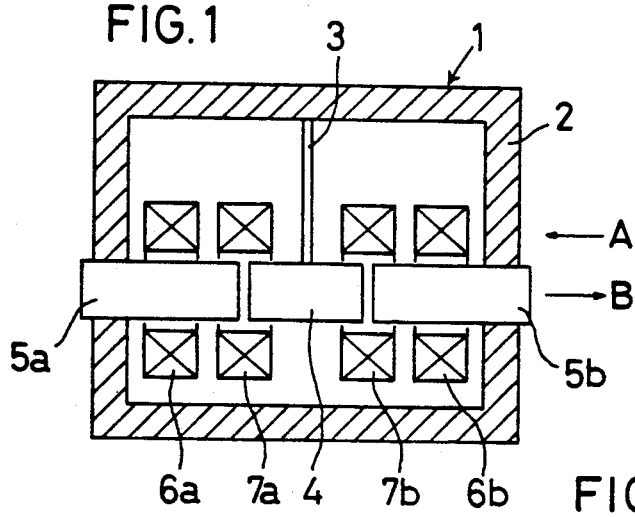
FIG. 1 is a schematic view of the first embodiment of the acceleration detector according to this invention.

FIG. 1 shows the first embodiment. This acceleration detector 1 comprises a case 2, a leaf spring 3 having one end thereof fixed to the case 2 and the other end secured to a movable magnetic body 4 of a predetermined mass. Stoppers 5a and 5b made of a magnetic material are supported by the case 2 so as to be located at both ends of the movable magnetic body 4. A gap is formed between each stopper and the movable magnetic body 4. Around the movable magnetic body 4 and the stoppers 5a and 5b, there are provided in coaxial relation with each other primary coils 6a and 6b for generating magnetic flux and secondary coils 7a and 7b for detecting fluctuations of the magnetic flux. The coils may be supported by the stoppers or by the case.

In the operation of the first embodiment of the detector, when the moving body is accelerated or decelerated, a force $F = M \times G$ (M is the mass of the movable magnetic body 4 and G is the acceleration) will act on the movable magnetic body 4. The force F will resiliently deform the leaf spring 3 while displacing the movable magnetic body until it balances the resilient force of the leaf spring 3. The amount of displacement is proportional to the acceleration provided the spring constant of the leaf spring 3 and the mass M of the movable magnetic body 4 are constant. Thus, the gaps between the stoppers 5a and 5b and the movable magnetic body 4 will change in proportion to the acceleration G.

Suppose now that the acceleration detector 1 is subjected to acceleration in the direction of arrow A in the figure. Then the movable magnetic body 4 will move in the direction B, reducing the gap with the stopper 5b and increasing the gap with the stopper 5a. This provides a smoother flow of magnetic flux from the stopper 5b to the magnetic body 4, thus increasing the amount of magnetic flux transmitted from the primary coil 6b to the secondary coil 7b. Thus a voltage larger than when the acceleration is zero will be induced in the secondary coil 7b. On the other hand, at the stopper 5a, the magnetic reluctance increases due to the increased gap, thus reducing the magnetic flux passing through the secondary coil 7a. Thus, the output voltage will reduce, too. Thus, the output of the secondary coil 7b will increase and that of the secondary coil 7a will decrease due to the above-described action. This will create a large difference in output between the secondary coils and thus the sensitivity of detection is higher compared with any prior art detector.

When an excessive acceleration acts in the direction A, the movable magnetic body 4 will abut the stopper 5b and be prevented from moving any further. This prevents excessive distortion of the leaf spring 3 due to excessive acceleration, thus protecting it from permanent deformation and breakage.

Figure 2:
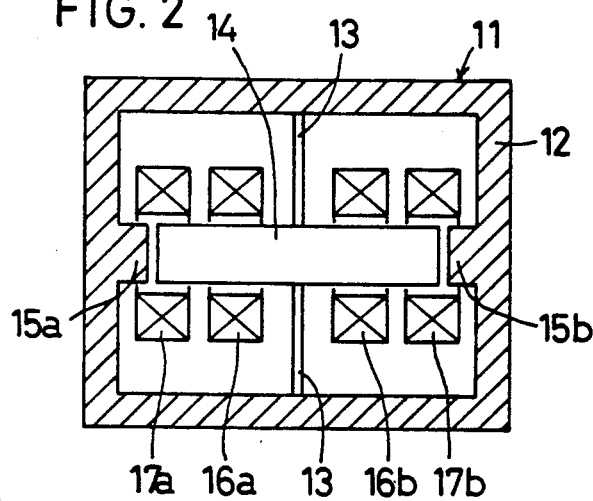
FIGS. 2 to 7 are schematic views of other embodiments.

FIG. 2 shows the second embodiment. This acceleration detector 11 is similar in construction and function to the first embodiment. But it differs from the first embodiment in that the magnetic body 14 is supported by a pair of leaf springs 13 each having one end thereof secured to the case, that the primary coils 16a and 16b are provided around and coaxially with the movable magnetic body 14 while the secondary coils 17a and 17b are disposed outside the primary coils (i.e. to the front and rear of these coils with respect to the direction of movement), and in that stoppers 15a and 15b are part of the case 12. By providing the primary coils inside (near the leaf spring) and the secondary coils outside (near the case), the movable magnetic body 14 can be increased both in size and weight without increasing the size of the detector. This will be advantageous for further improvement in sensitivity.

There is a concern that if the movable magnetic body 14 has a large mass, it may move not only in the desired directions but also up and down due to vertical acceleration, thereby producing disturbances in the output voltage. In this embodiment, because the magnetic body 14 is supported by a pair of leaf springs, this problem can be prevented.

Also, in this embodiment, because not only the stoppers but also the entire case is made of a magnetic material, the magnetic reluctance in the magnetic circuits around the coils can be reduced. This increases the ratio of the magnetic reluctance at the gaps to the entire magnetic reluctance and thus further increases the sensitivity of detection.

Figure 3:
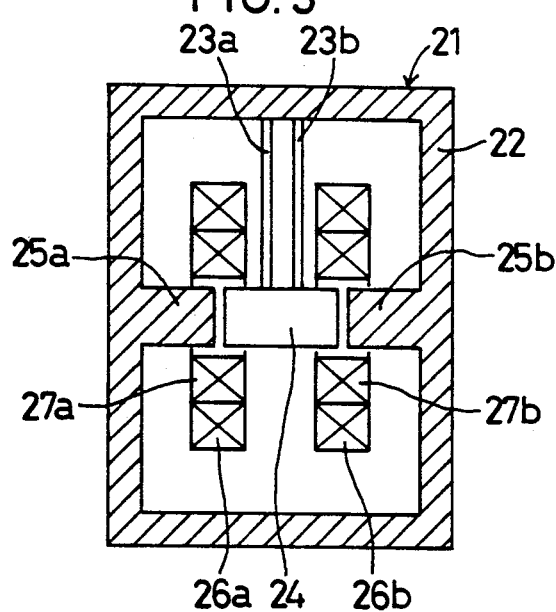

FIG. 3 shows the third embodiment. This acceleration detector 21 is basically the same in construction and function as the first and second embodiments. The only differences are that a movable magnetic body 24 is supported by two cantilever leaf springs 23a and 23b extending parallel to each other and that secondary coils 27a and 27b are provided coaxially on the outer periphery of primary coils 26a and 26b.

In this embodiment, by the provision of the two cantilever leaf springs, the movable magnetic body can not only be supported as stably as in the second embodiment but also it can move as large an amount as it would if supported by a single cantilever leaf spring. In other words, this arrangement satisfies the two requirements which are otherwise a compromise with respect to one another, i.e. the requirements for stability and increased output.

Also, by disposing the primary coils and the secondary coils one upon the other, the width of the overall winding of the coils can be reduced. Thus, this structure will be of advantage in a case where the mounting space is limited with respect to the direction in which acceleration acts.

Figure 4:
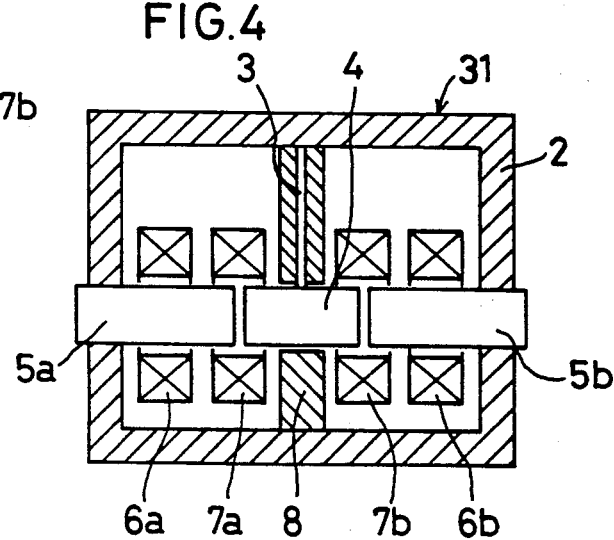

FIG. 4 shows the fourth embodiment of this invention. This acceleration detector 31 has the same construction as the first embodiment except that a yoke 8 made of a magnetic material is provided between the secondary coils 7a and 7b to reduce the magnetic reluctance. By the provision of the yoke 8, the magnetic flux produced in the primary coil 6a or 6b can propagate through the movable magnetic body 4, the yoke 8 and the case 2 made of a magnetic material and back into the respective stoppers 5a and 5b. With this arrangement, the magnetic reluctance is high in the magnetic circuits, only at the gaps formed between the stoppers and the movable magnetic body thus making more conspicuous the changes in output with fluctuations in the width of the gaps. As a result, the sensitivity of detection will improve.

Figure 5:
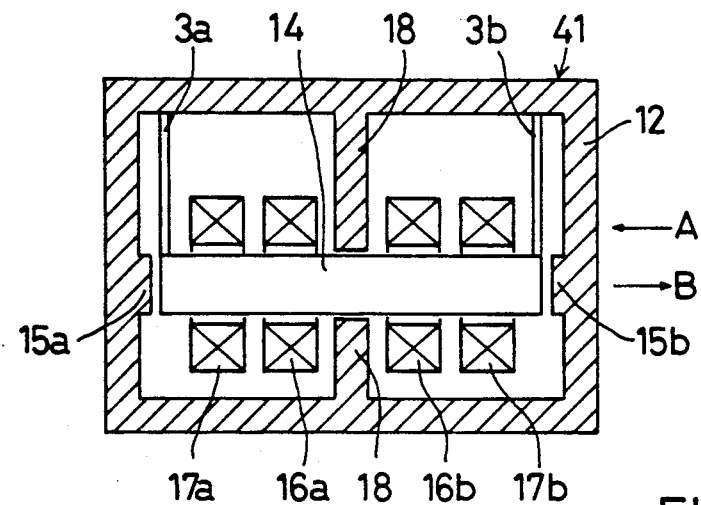

FIG. 5 shows the outline of the fifth embodiment. This acceleration detector 41 comprises a case 12 made of a magnetic material, leaf springs 3a and 3b having one end thereof fixed to the case 2, and a movable magnetic body 14 having a predetermined mass and secured to the other or free end of the leaf springs 3a and 3b. The case 12 forms projections 15a and 15b opposite to both ends of the movable magnetic body 14 with gaps formed therebetween. A yoke 18 also formed by the case is provided between primary coils 11a and 16b.

The primary coils 16a and 16b for generating magnetic flux and the secondary coils 17a and 17b for detecting changes in the magnetic flux are supported by the case so as to be located coaxially around the movable magnetic body 14.

Figure 6:
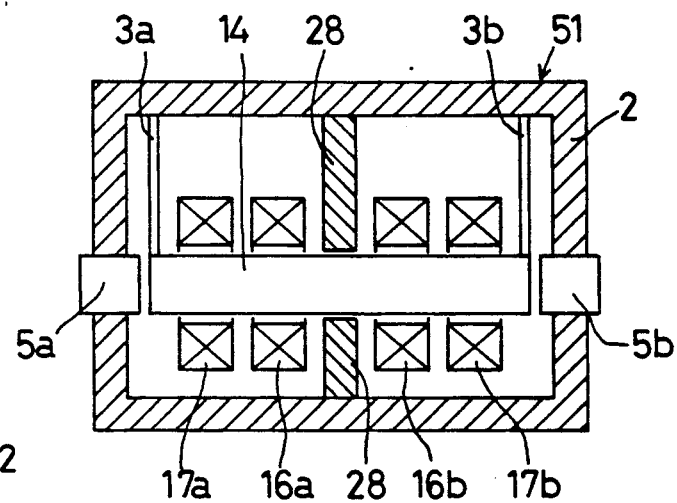

FIG. 6 shows the sixth embodiment. This acceleration detector 51 has the same construction and function as the fifth embodiment except that the case 2 is made of a non-magnetic material, that magnetic stoppers 5a and 5b are fixedly mounted on the case, and that a yoke 28 provided between the coils 16a and 16b is supported by the case but is not formed by the case itself. The case made of a non-magnetic material serves to reduce the entire weight of the detector. However, the magnetic reluctance in the circuits is not too great because the yoke is provided.

Figure 7:
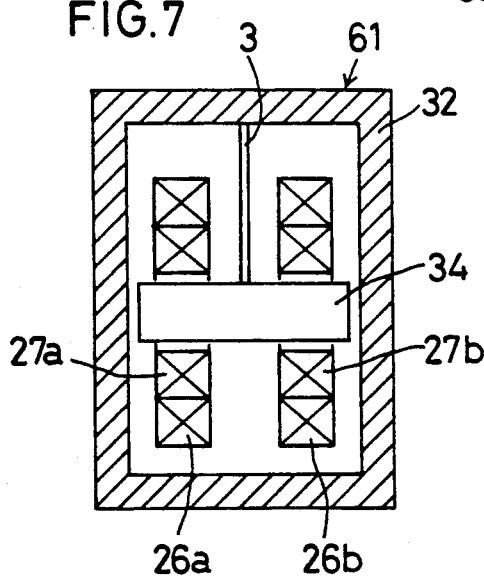
Figure 8:
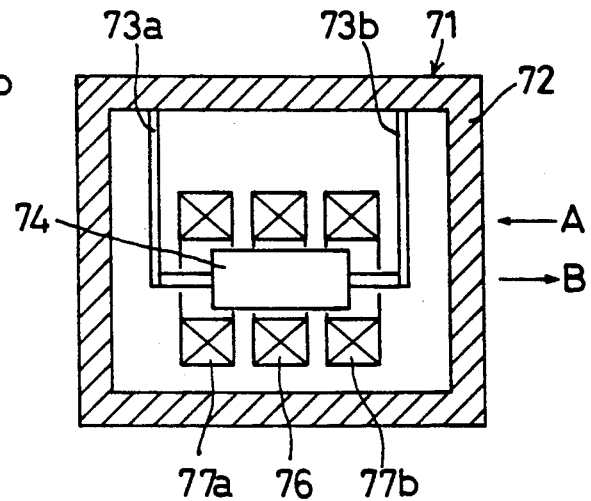
FIG. 8 is a schematic view of a prior art differential transformer type acceleration detector.

FIG. 7 shows the seventh embodiment. This detector 61 has the same construction and function as the fifth embodiment except that the primary coils 26a and 26b are placed on the outer periphery of the secondary coils 27a and 27b, that the yoke between the coils is omitted, that a single leaf spring 3 is used instead of two, and that stopper protruding from the inner surface of the case are omitted so that the movable magnetic body 34 will directly face the wall surface of the case. In this embodiment, although the output tends to be lower than in the fifth embodiment, the amount of displacement of the movable magnetic body can be increased easily. Because the width of winding of coil can be reduced, this embodiment is advantageously applicable to a situation where the mounting space is limited with respect to the direction in which acceleration acts.

What is claimed is:

1. An acceleration detector comprising: a case having an inner peripheral surface; a magnetic body disposed in said case and having opposite ends; at least one leaf spring having one end secured to said case at the inner peripheral surface thereof and the other end secured to said magnetic body and supporting said magnetic body within said case in a manner in which said magnetic body is movable in either of two opposite directions such that the magnetic body will be displaced in one of said directions when it is subjected to an acceleration acting in the other of said directions; stoppers protruding from said inner peripheral surface to locations adjacent the opposite ends of said magnetic body, respectively, said stoppers being spaced from the opposite ends of said magnetic body in said directions in which the magnetic body is movable such that a respective gap is defined between said magnetic body and each of said stoppers; a differential transformer comprising two pairs of primary and secondary coils disposed in said case; a yoke extending from the inner peripheral surface of said case to a location adjacent said magnetic body between the opposite ends thereof, said yoke being located between said pairs of coils; and said stoppers and said yoke each being of a soft magnetic material so as to constitute with said magnetic body and said case magnetic circuits through which magnetic flux, generated by said primary coils when energized, propagates across said gaps, whereby said gaps establish a reluctance of the magnetic circuits so that a difference in induced voltage output by said secondary coils is produced upon displacement of the magnetic bodies due to acceleration.

2. An acceleration detector as claimed in claim 1, wherein said stoppers are formed by part of said case such that said case and said stoppers constitute a one-piece member.

3. An acceleration detector as claimed in claim 1, wherein said stoppers protrude into said differential transformer.

4. An acceleration detector as claimed in claim 1, wherein said primary coils extend around said magnetic body and are concentric therewith.

5. An acceleration detector as claimed in claim 1, wherein said secondary coils extend around said magnetic body and are concentric therewith.

6. An acceleration detector as claimed in claim 1, wherein said primary and said secondary coils extend around said magnetic body and are concentric therewith.

7. An acceleration detector as claimed in claim 1, wherein at least that part of said case which is located between said stoppers and said yoke is also of a soft magnetic material.

* * * * *